United States Patent
Bhat et al.

(10) Patent No.: US 12,032,415 B2
(45) Date of Patent: Jul. 9, 2024

(54) LOCKING AND POSITION STATUS DETECTION SCHEME FOR AN ELECTRONIC DEVICE

(71) Applicant: Intel Corporation, Santa Clara, CA (US)

(72) Inventors: Praveen Kashyap Ananta Bhat, Bangalore (IN); Tarakesava Reddy Koki, Hyderabad (IN); Jaison Fernandez, Kollam (IN); Ruchi Sitaram Padekar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 17/033,561

(22) Filed: Sep. 25, 2020

(65) Prior Publication Data

US 2021/0011520 A1   Jan. 14, 2021

(51) Int. Cl.
*G06F 1/16*   (2006.01)

(52) U.S. Cl.
CPC .......... *G06F 1/1679* (2013.01); *G06F 1/1616* (2013.01)

(58) Field of Classification Search
CPC .... G06F 1/1656; G06F 1/1677; G06F 1/1679; G06F 1/1684
See application file for complete search history.

(56) References Cited

U.S. PATENT DOCUMENTS

| | | | |
|---|---|---|---|
| 9,035,872 B2* | 5/2015 | Brown | G06F 3/01 345/156 |
| D814,435 S * | 4/2018 | Kwon | D14/138 AB |
| 10,496,129 B2* | 12/2019 | Miyamoto | G06F 1/1694 |
| 10,788,860 B2* | 9/2020 | Bai | G06F 1/1677 |
| 10,945,346 B2* | 3/2021 | Moon | H05K 5/0226 |
| 2006/0135226 A1* | 6/2006 | Won | H04M 1/0245 455/575.3 |

(Continued)

FOREIGN PATENT DOCUMENTS

EP    3661177 A1    6/2020

OTHER PUBLICATIONS

Dell Technologies, Browse Community, "Dell Inspiron 5559 Faulty Lid Switch," Jul. 14, 2019, retrieved on Aug. 17, 2020 from https://www.dell.com/community/Inspiron/Dell-Inspiron-5559-Faulty-Lid-Switch/td-p/7336159, 10 pgs.

(Continued)

*Primary Examiner* — Adrian S Wilson
(74) *Attorney, Agent, or Firm* — Alliance IP, LLC

(57) ABSTRACT

An example apparatus comprises a first member with a first surface, where the first member is movable relative to a second member with a second surface. The first member comprises a first magnet configured to produce a first magnetic field. The second member comprises a sensor operatively connected to a processor and a second magnet adjacent to the sensor. In a first position, the first magnet and the second magnet are engaged to magnetically hold the first member to the second member such that at least a portion of the first surface of the first member opposes at least a portion of the second surface of the second member. In the first position, the sensor is to detect the first magnetic field produced by the first magnet and is to send a signal to the processor in response to detecting the first magnetic field produced by the first magnet.

23 Claims, 10 Drawing Sheets

(56) References Cited

U.S. PATENT DOCUMENTS

| | | | |
|---|---|---|---|
| 2008/0238816 A1* | 10/2008 | Matsushita | G06F 1/1677 345/30 |
| 2009/0051174 A1* | 2/2009 | Ho | E05C 1/10 292/251.5 |
| 2010/0298032 A1* | 11/2010 | Lee | G06F 1/1616 345/173 |
| 2012/0154288 A1* | 6/2012 | Walker | G06F 1/1677 345/169 |
| 2013/0205142 A1* | 8/2013 | Jung | G06F 1/1677 713/300 |
| 2014/0043735 A1 | 2/2014 | Han | |
| 2014/0362514 A1 | 12/2014 | Raff et al. | |
| 2015/0378557 A1* | 12/2015 | Jeong | G06F 1/1652 715/835 |
| 2016/0026219 A1* | 1/2016 | Kim | H04M 1/0245 345/173 |
| 2018/0375975 A1* | 12/2018 | Kikuchi | G06F 1/1686 |
| 2020/0233046 A1* | 7/2020 | Ding | G01R 33/072 |
| 2020/0264826 A1* | 8/2020 | Kwon | G06F 3/1423 |
| 2020/0387197 A1* | 12/2020 | Itoh | G06F 1/1684 |

OTHER PUBLICATIONS

Khagendra Thapa, "Making Switches Smarter with True Micropower Hall Effect Sensors," Diodes, Inc., copyright 2020, retrieved on Aug. 6, 2020 from https://www.diodes.com/design/support/technical-articles/making-switches-smarter-with-true-micropower-hall-effect-sensors/, 6 pgs.

EPO; Extended European Search Report issued in EP Application No. 21193109.2, dated Feb. 21, 2022; 8 pages.

\* cited by examiner

OPEN POSITION

CLOSED POSITION

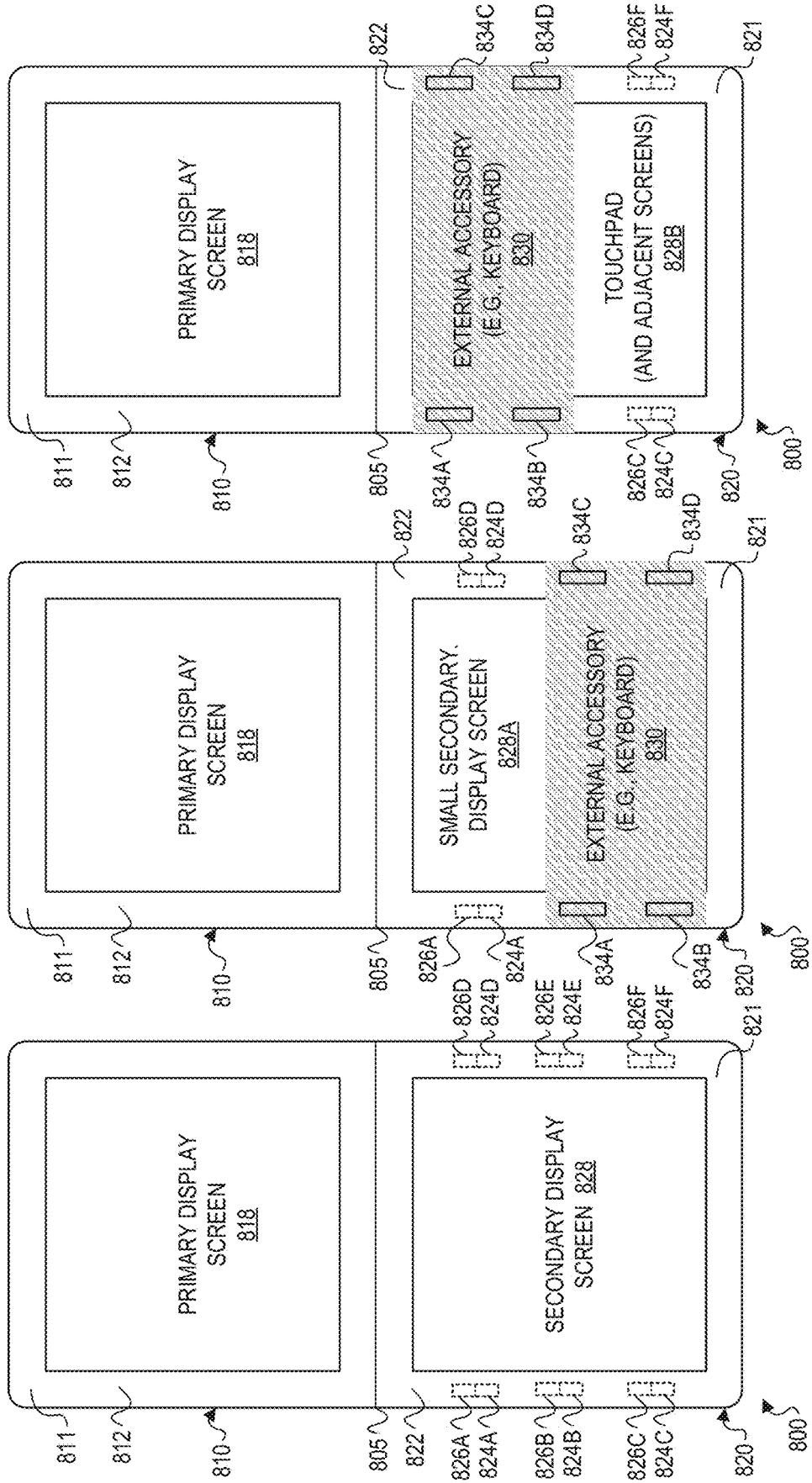

LOCKING AND POSITION STATUS DETECTION SCHEME FOR AN ELECTRONIC DEVICE

TECHNICAL FIELD

This disclosure relates in general to electronic devices, and more particularly, to a locking and position status detection scheme for an electronic device.

BACKGROUND

As technology evolves, electronic devices are produced using ever smaller and thinner designs. Many electronic devices, such as laptops and notebooks, are configured with a lid member rotatably attached to a base member and rotatable between an open position and a closed position, with the lid member containing a display screen. In some devices, certain components may be embedded in a bezel area around the display screen. As devices are designed to be smaller and thinner, however, the width of the bezel area may also be reduced, potentially limiting the size and number of computer components that can utilize the bezel space. Thus, creative solutions are needed to accommodate desired computer components in electronic devices while enabling the trend to reduce the size of such devices.

BRIEF DESCRIPTION OF THE DRAWINGS

FIGS. 8A-8C are schematic views of a dual display computing device with a locking and position status detection scheme used in conjunction with an example external accessory according to an embodiment.

Like reference numbers and designations in the various drawings indicate like elements.

DETAILED DESCRIPTION OF EXAMPLE EMBODIMENTS

Electronic devices, such as laptops and notebooks, are becoming thinner and lighter as technology evolves. Designers of laptops and other electronic devices with screens often attempt to narrow a bezel area around a screen in order to reduce the size of the device and/or maximize the size of the screen. Certain components, however, are often placed in the bezel area and can limit the use of the bezel area for other components and hinder narrowing of the bezel area. In particular, one magnet of a magnet pair used to lock the device in a closed position may be placed in the bezel area of a lid member, and a magnet (or sensor) of a magnet and sensor pair used to detect the status of the lid member may also be placed in the bezel area of the lid member. This disclosure introduces an improved locking and position status detection scheme, which reduces the number of magnets used to lock the device and detect the position status to address these issues, among other example features and advantages.

Figure 1:
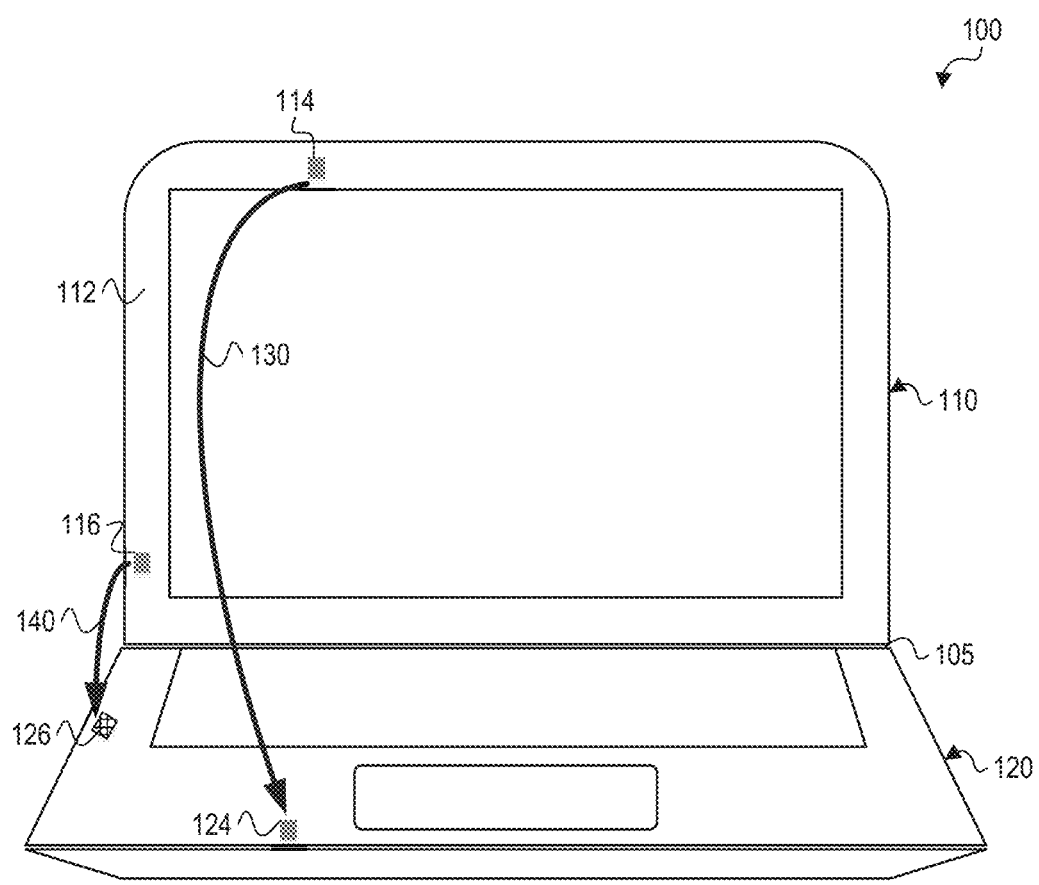
FIG. 1 is a schematic view of a laptop computer illustrating a conventional scheme for locking and position status detection.

FIG. 1 is a schematic view of a laptop computer 100 in an open position illustrating a conventional scheme for locking and position status detection. Laptop computer 100 includes a lid member 110 rotatably connected to a base member 120, where the connection between the lid member and the base member allows movement of the members relative to one another around or about an axis, which may be a connection mechanism in the form of a hinge. In this locking and position status detection scheme, two separate magnets are contained in a bezel area 112 of lid member 110. A first lid magnet 114 contained in a bezel area 112 of lid member 110 helps to magnetically lock the lid member to base member 120 as the lid magnet engages a base magnet 124 contained in the base member when the lid member is closed, as indicated by arrow 130.

A second lid magnet 116 contained in bezel area 112 of lid member 110 is used for triggering a Hall sensor 126 contained in base member 120 to detect whether the device is in an open or closed position. Second lid magnet 116 and Hall sensor 126 are positioned in their respective members of the laptop computer such that the magnet and sensor are aligned when the laptop computer is in a closed position, as indicated by arrow 140.

Figure 2A:
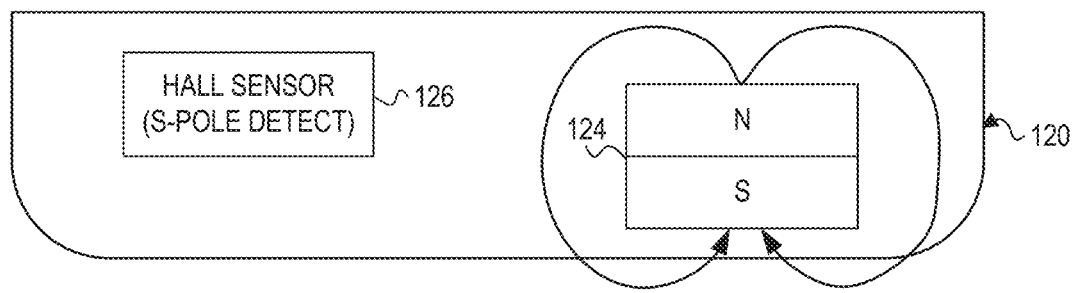
FIG. 2A is a simplified block diagram illustrating a base member of a laptop computer of FIG. 1 in an open position using a conventional locking and position status detection scheme.

FIG. 2A is a side view of base member 120 of laptop computer 100 in an open position, where base magnet 124 and Hall sensor 126 are contained in the base member. A Hall sensor detects the magnetic field running perpendicular to the top layer of the Hall sensor. In order to prevent false closed status detections, Hall sensor 126 and base magnet 124 are sufficiently spaced in the base member 120 relative to each other to ensure that magnetic fields produced by the base magnet are not detected by the sensor.

Figure 2B:
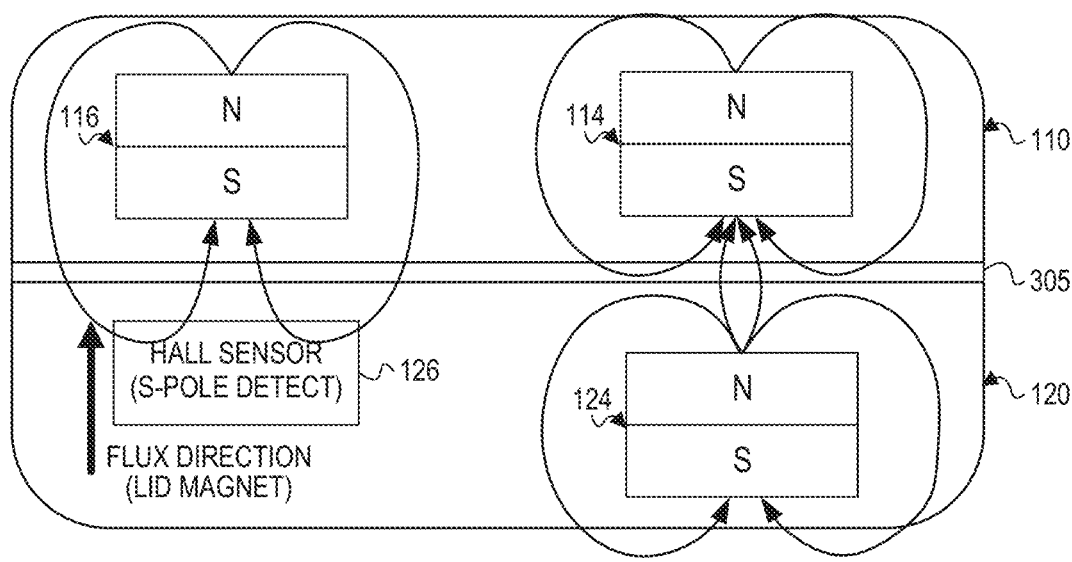
FIG. 2B is a simplified block diagram illustrating a base member and a lid member of a laptop computer of FIG. 1 in a closed position using a conventional locking and position status detection scheme.

FIG. 2B is a side view of lid member 110 and base member 120 of laptop computer 100 when the laptop computer is a closed position. When the laptop computer is in a closed position, the first lid magnet 114 and the base magnet 124 engage to magnetically lock the lid member and the base member relative to each other. Thus, the laptop computer remains in the closed position until an appropriate amount of force is applied to separate the magnets and rotate the lid member and/or base member relative to the other.

Additionally, when the laptop computer is in a closed position as shown in FIG. 2B, the Hall sensor 126 detects the magnetic field of second lid magnet 116, and may send a status signal (e.g., by generating an output voltage) to a processor of the laptop computer to indicate the closed position. When the lid member is opened, the Hall sensor no longer detects the magnetic field, and stops sending the status signal (e.g., by no longer generating an output voltage). The absence of the status signal from the Hall sensor can indicate the open position of the lid member of the laptop computer. The processor can use the status signals from the Hall sensor 126 to determine whether to put the laptop computer in a sleep state.

Conventional approaches as shown in FIGS. 1 and 2A-2B require separate magnets for locking the laptop computer and for position status detection. The magnets in the bezel area need to be spaced to maintain sufficient distance therebetween to avoid magnetic field interference. Similarly, the base magnet and the corresponding sensor need to be spaced to maintain sufficient distance to avoid magnetic field interference and false triggers by the sensor. Additionally, the bezel area of the lid member has to be sized to accommodate two magnets and the required spacing between the magnets to perform both a locking function and a position status detection function. These constraints may limit the ability to reduce the size of the device and/or to optimize the design of the bezel area. Furthermore, such constraints can result in complexity in the system design and increased costs of the system. Additionally, other mechanisms used to automatically lock the base member and the lid member, such as a hinge autolocking mechanism, have proved to be inefficient for proper locking.

An improved locking and position status detection scheme, as disclosed herein, can solve these issues (and more). The improved locking and position status detection scheme offers a novel approach for placement and orientation of magnets and a sensor such that a single magnet on one member of an electronic device, in conjunction with a sensor and magnet on another member of the electronic device, is sufficient to activate locking and position status detection of the electronic device. In an embodiment of the improved locking and position status detection scheme, the properties of the sensor may be used to determine the placement and orientation of magnets used to lock (with a magnetic force) the opposing members of the electronic device and to detect the position status (e.g., open or closed, position of one member relative to another member, etc.) of the electronic device. In one example, a Hall sensor may be used as it can detect magnetic fields running perpendicular to a top layer of the sensor package. A Hall sensor cannot detect magnetic fields that run parallel to the package top layer. This principle may be used to determine appropriate placement and orientation of magnets and the sensor such that a single magnet on the one member, in conjunction with a sensor and magnet on another member, can be used for locking the electronic device and for triggering the sensor.

Figure 3:
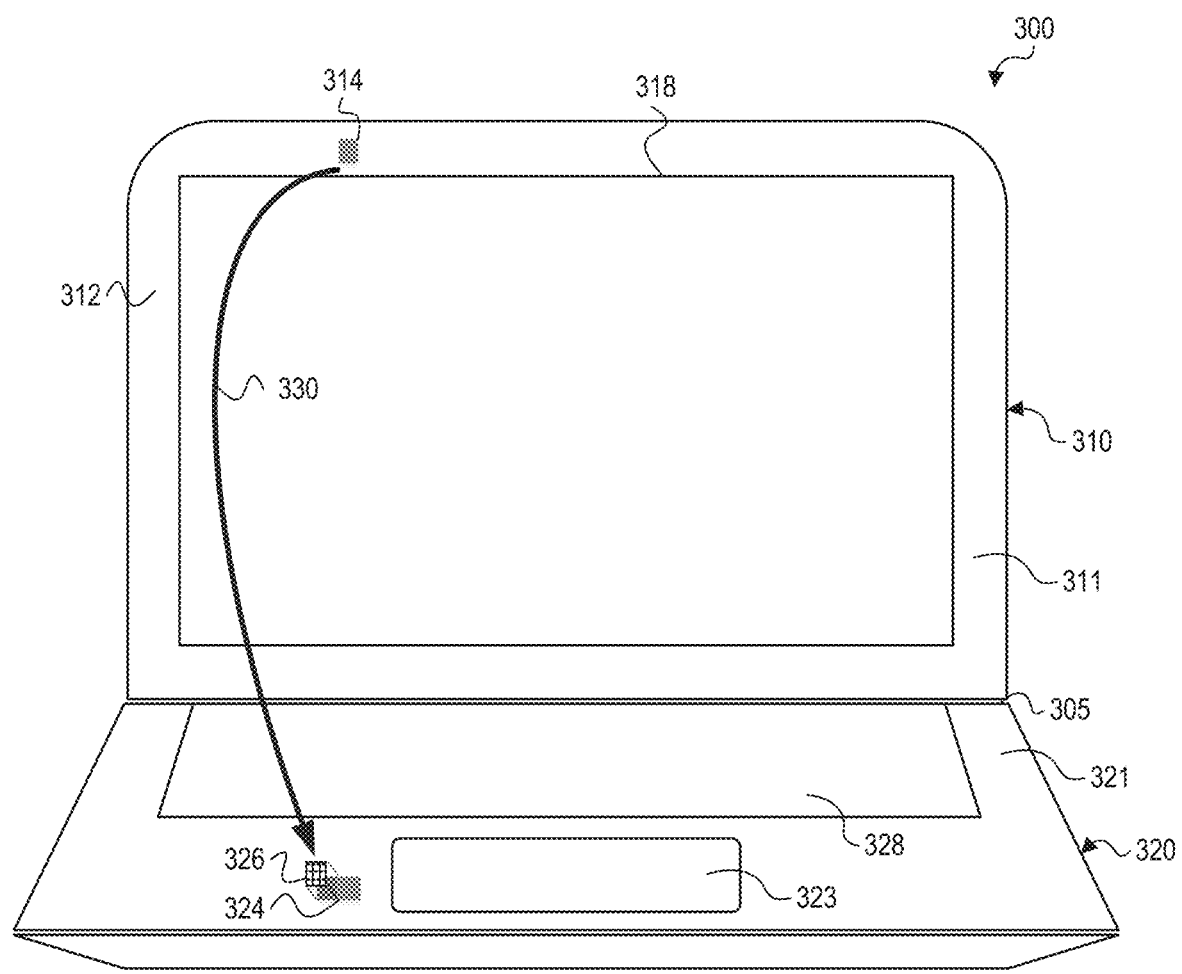
FIG. 3 is a schematic view of a laptop computer illustrating an improved locking and position status detection scheme according to an embodiment.

In a particular example (e.g., such as shown in FIG. 3), a first magnet is used on a lid member of a laptop computer, a second magnet is used on a base member of the laptop computer, and a sensor is placed adjacent to and above the second magnet in the base member such that the sensor is positioned between the first magnet in the lid member and the second magnet in the base member when the laptop computer is in a closed position. For example, the sensor may be sandwiched between the first magnet and the second magnet when the laptop computer is in a closed position. The laptop computer is in the closed position when the lid member and/or the base member is rotatably adjusted to align the lid member and the base member such that opposing surfaces of the members are adjacent and substantially parallel to one another. The first magnet is selected to produce a magnetic field with lines of flux that are perpendicular to a magnetic field detection area (e.g., top surface) of the sensor when the electronic device is in the closed position. The second magnet is selected to produce a magnetic field with lines of flux that are parallel to the magnetic field detection area of the sensor. During an "open lid mode", the sensor conveys to a processor that the lid member is open (e.g., by not sending any signals), because the sensor is not triggered by the parallel (e.g., horizontal) magnetic fields from the base magnet. During a "closed lid mode", the lid magnet gets closer to the sensor and the sensor detects the perpendicular magnetic fields from the lid magnet. Accordingly, the sensor conveys to the processor that the lid member is closed (e.g., by sending a signal to the processor). Also, opposite poles of the lid magnet and the base are magnetically attracted as they move closer together and engage to provide a locking mechanism to magnetically hold (or lock) the lid member and the base member adjacent and substantially parallel to one together. Additionally, it should be apparent that the broad concept of a single magnet disposed on one member of an electronic device together with a sensor and second magnet disposed on another member of the electronic device can be used in a myriad of different electronic devices having two members that move relative to one another and for which a locked mode and position status detection of the members is desired.

An improved locking and position status detection scheme as shown and described herein can provide many advantages. For example, in an electronic device such as a laptop, the improved status detection scheme can be implemented in a reduced amount of bezel area on the lid member of the laptop. The bezel area of laptops and other electronic devices with screens is typically crowded with other features such as a camera, vision companion chip, microphones, various radio frequency (RF) antennae (e.g., LTE AUX, Main, etc.). The improved locking and position status detection scheme can be implemented with a single magnet in one member (e.g., in the bezel area in some designs) and is more flexible in the placement of the remaining magnet since it is not necessary in the improved scheme to maintain a distance between the sensor and magnet. Furthermore, the using a single magnet in one member to both lock a device and trigger a position status sensor can reduce the system design complexities and may also reduce the cost to implement the locking and position status detection feature.

Turning to FIG. 3, FIG. 3 is a schematic view of an example laptop computer 300 in an open position illustrating an improved locking and position status detection scheme according to at least one embodiment. Laptop computer 300 includes a lid member 310 rotatably connected to a base member 320, where the connection between the lid member and the base member allows movement of the members relative to one another around or about a fixed axis. The axis may be defined by a connection point 305 in the form of a hinge that rotatably connects the lid member and base member at opposing ends of the lid member and the base member. A display screen 318 may be contained in lid member 310 and visible through an inner surface 311 of the lid member. A bezel area 312 may be defined between the edges of the display screen 318 and a perimeter of the lid member 310. The bezel area may partially or fully surround display screen 318. In one example, inner surface 311 could be a glass cover, tempered glass cover, or any other suitable material through which the display can be viewed and which may optionally be used to implement touchscreen capabilities. Inner surface 311 may be a single surface extending over the bezel area and the display screen. Alternatively, inner surface 311 may include a combination of two or more separate surfaces. For example, the bezel area may have one bottom surface of any suitable material, and the display screen may have a separate bottom surface of any suitable material.

In one example, a keyboard 328 may be provided in base member 320 and may be integrated with a top surface 321 of the base member. Similarly, a touchpad 323 may be provided in base member 320 and may be integrated with the top surface 321 of the base member.

In this improved locking and position status detection scheme, a single lid magnet 314 is contained in bezel area 312 of lid member 310. Lid magnet 314 engages a base magnet 324 contained in base member 320 to magnetically lock lid member 310 to base member 320 in a closed position. In one example, the lid member and base member may be locked in a closed position as a result of the magnetic attraction between lid magnet 314 and base magnet 324. Lid member 310 and base member 320 may be magnetically held together such that inner surface 311 of lid member 310 is adjacent and substantially parallel to top surface 321 of base member 320.

A sensor 326 may be contained in base member 320 and positioned above at least a portion of base magnet 324 such that sensor 326 is positioned between lid magnet 314 and the at least a portion of base magnet 324 when the laptop computer is in a closed position, as indicated by arrow 330. Thus, when the laptop computer is in a closed position, the single lid magnet 314 is sufficiently close to the base magnet 324 and the sensor 326 to be attracted to and engage the base magnet 324 and to enable sensor 326 to detect the magnetic field of the single lid magnet 314.

The single lid magnet 314 contained in bezel area 312 of lid member 310 may be embedded, attached, or otherwise fixed to, on, or within lid member 310. Similarly, sensor 326 and/or base magnet 324 contained in base member 320 may be embedded, attached, or otherwise fixed to, on, or within base member 320.

Figure 4A:
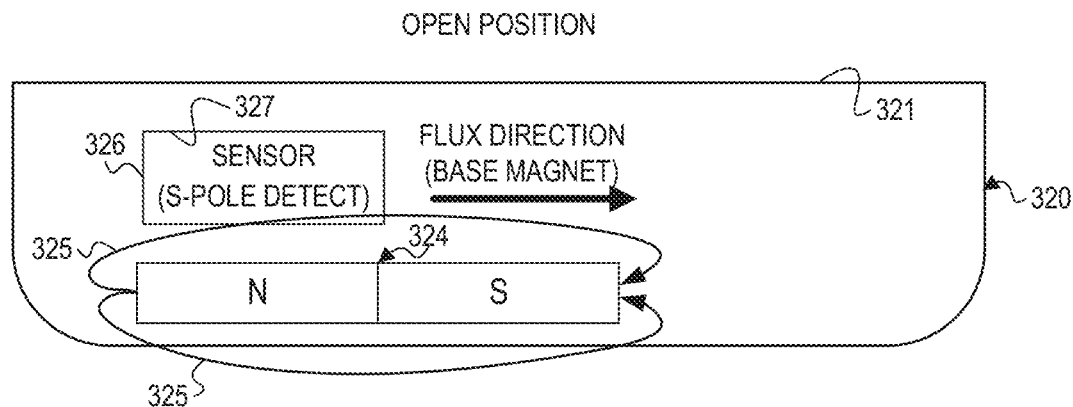
FIG. 4A is a simplified block diagram illustrating an example base member of the laptop computer of FIG. 3 in an open position using the improved locking and position status detection scheme according to an embodiment.

FIG. 4A is a schematic side view of base member 320 of laptop computer 300 in an open position, where base magnet 324 and sensor 326 are contained in the base member with sensor 326 positioned above at least a portion of the base magnet. In the open position, lid member 310 is not parallel (or substantially parallel) base member 320. Therefore, in the open position, lid magnet 314 is not aligned with sensor 326. In at least one embodiment, sensor 326 may be configured to detect a magnetic field with flux lines that are perpendicular to a detection mechanism of the sensor. In one example, sensor 326 may be a Hall sensor. However, any other sensor or switch that detects a magnetic field and produces an output signal in response to the detection (or absence of detection) may be used.

In an embodiment, sensor 326 may be configured with a top layer 327 as a detection mechanism to detect a magnetic field running perpendicular to the top layer. Sensor 326 may be oriented such that top layer 327 is at least substantially parallel to top surface 321 of base member 320, and therefore, substantially parallel to inner surface 311 of lid member 310 when the members are in a closed position. The configuration and orientation of base magnet 324 can be selected to produce a magnetic field with lines of flux 325 that are generally parallel, rather than perpendicular, to the detection mechanism (e.g., top layer 327) of the sensor. Thus, base magnet 324 can be oriented to prevent detection of its magnetic field by sensor 326.

In one example, base magnet 324 may be configured with a north pole (N) and a south pole (S) and oriented to produce a magnetic field with lines of flux 325 that are generally parallel to top layer 327 of sensor 326 (and to top surface 321 of base member 320). Base magnet 324 could be, for example, an axially magnetized bar magnet that is longitudinally oriented in base member 320 to produce the magnetic field with lines of flux 325 that are generally parallel to the top layer 327 of sensor 326. Thus, sensor 326 is not triggered by the magnetic field of base magnet 324 even if the sensor is placed on top of the base magnet. Additionally, base magnet 324 may be positioned such that its north pole (N) end is adjacent to and below sensor 326. This enables a single lid magnet (e.g., 314) with a south pole end facing base member 320 to function as a trigger for sensor 326 and to magnetically engage base magnet 324.

Figure 4B:
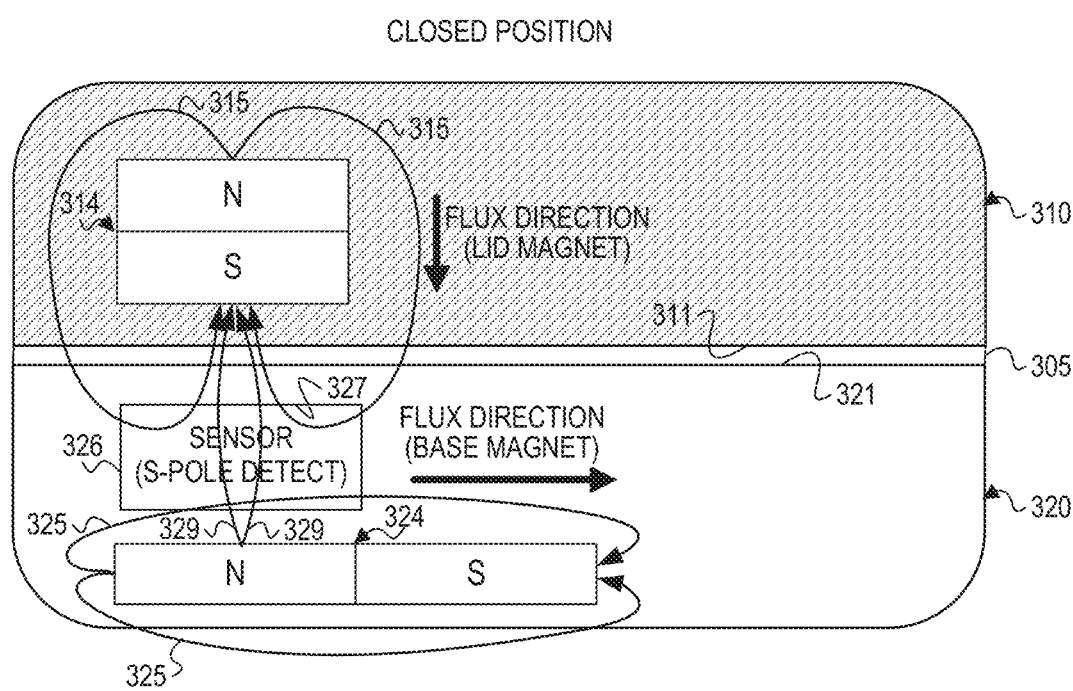
FIG. 4B is a simplified block diagram illustrating the base member and a lid member of the laptop computer of FIG. 3 in a closed position using the improved locking and position status detection scheme according to an embodiment.

FIG. 4B is a schematic side view of lid member 310 and base member 320 of laptop computer 300 when the laptop computer is in a closed position. In the closed position, inner surface 311 of lid member 310 opposes top surface 321 of base member 320 and is at least substantially parallel and adjacent to the top surface of the base member. In at least one embodiment, a slight spacing may separate the inner surface of the lid member from the top surface of the base member. In other embodiments, the inner surface of the lid member may abut the top surface of the base member. In this example, lid magnet 314 includes a north pole (N) and a south pole (S) and is arranged for the south pole (S) to be aligned with and facing toward sensor 326 when the laptop computer is in the closed position. The lid magnet 314 is further configured and arranged to produce a magnetic field with lines of flux 315 that are perpendicular to an inner surface 311 of lid member 310. Thus, the magnetic field runs perpendicular to top layer 327 of sensor 326 when the laptop computer is in a closed position. Also, when the laptop computer is in the closed position, lid magnet 314, a portion (e.g., north pole) of base magnet 324, and sensor 326 may be aligned such that the sensor is positioned between the lid magnet and the portion of the base magnet.

When the laptop computer is in the closed position as shown in FIG. 4B, the south pole (S) of lid magnet 314 and the north pole (N) of base magnet 324 engage at 329 to magnetically hold the lid member and the base member together such that inner surface 311 of lid member 310 is at least substantially parallel and adjacent to top surface 321 of base member 320. Thus, the lid member and base member may remain in the closed position until an appropriate amount of force is applied to separate the magnets by rotatably moving the lid member and/or base member about the fixed axis of connection point 305 away from each other.

Additionally, when the laptop computer is in a closed position as shown in FIG. 4B, the sensor 326 detects the magnetic field of lid magnet 314. The sensor can provide a position status signal to a processor of laptop computer 300 to indicate that the laptop computer is in a closed position. When the lid member is rotated away from the base member (or vice versa), sensor 326 no longer detects the magnetic field, which indicates that the laptop computer is in an open position. In at least one embodiment, sensor 326 may stop sending position status signals to the processor as an indication that the laptop computer is in an open position. In some cases, the processor can use the position status signals from the sensor 326 (and/or lack of status signals) to determine whether to put the laptop computer in a sleep state or in a working state.

Figure 5A:
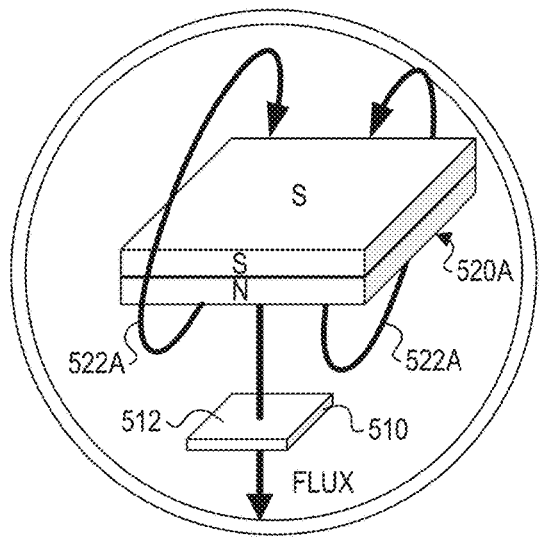
FIG. 5A is an example block diagram illustrating magnetic fields running perpendicular to a sensor.
Figure 5B:
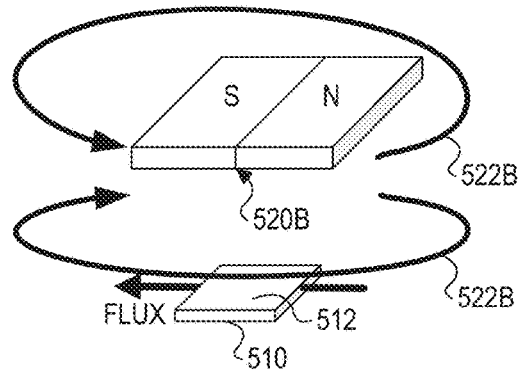
FIG. 5B is an example block diagram illustrating magnetic fields running horizontal to a sensor.

FIGS. 5A-5B are block diagrams illustrating the magnetic field detection mechanism in a Hall sensor 510. An integrated circuit of a Hall sensor cannot detect magnetic fields that run parallel to the package top layer, as shown in FIG. 5B. Instead, the integrated circuit of a Hall sensor detects magnetic fields that run perpendicular to the package top layer, as shown in FIG. 5A. In FIG. 5A, Hall sensor 510 has a package top layer 512 arranged to oppose a magnet 520A that produces a magnetic field with lines of flux 522A that run perpendicular to the top layer 512 of the sensor. Thus sensor 510 can detect the perpendicular magnetic field of magnet 520A when it moves close enough to sensor 510. In FIG. 5B, package top layer 512 of Hall sensor 510 is arranged to oppose a magnet 520B that produces a magnetic field with lines of flux 522B that run parallel to the top layer 512 of the sensor. Thus sensor 510 cannot detect the parallel magnetic field of magnet 520B, even if it is in close proximity to the sensor. In one or more embodiments, this basic principle is used to determine appropriate placement and orientation of magnets and a sensor in a computing device in order to avoid additional magnets needed for locking the computing device and for detecting the position status of the computing device.

Figure 6A:
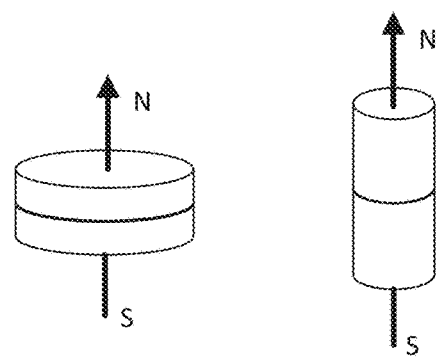
FIGS. 6A-6B are example shapes of axially magnetized magnets that may be used in an embodiment.
Figure 6B:
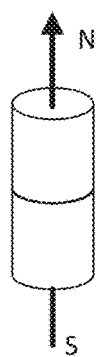
Figure 6C:
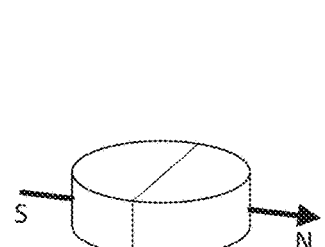
FIGS. 6C-6D are example shapes of diametrically magnetized magnets that may be used in an embodiment.
Figure 6D:
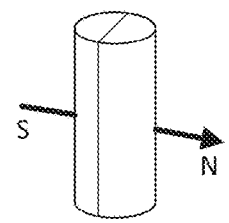

FIGS. 6A-6B illustrate various possible shapes of magnets that may be used in the improved locking and position status detection scheme disclosed herein. The magnets in one or more embodiments can be of different shapes such as disks, bars, and/or cylinders. The magnetic field distribution of the magnets can be either axial or diametric. FIG. 6A is an example of an axially magnetized disk-shaped magnet, FIG. 6B is an example of an axially magnetized cylinder-shaped magnet, FIG. 6C is an example of a diametrically magnetized disk-shaped magnet, and FIG. 6D is an example of a diametrically magnetized cylinder-shaped magnet. Although the embodiment of FIGS. 3 and 4A-4B is shown and described with an axially magnetized disk magnet (i.e., 314) and an axially magnetized bar magnet (i.e., 324), it should be appreciated that any other shape of magnet, such as magnets shown in FIGS. 6A-6D or others, may be used in an improved locking and position status detection scheme. The particular shape and magnetization may require changes to the orientation or positioning of the magnets in the lid member and the base member in order to ensure that the sensor (e.g., 326) does not falsely detect a closed position status from the base magnet and to ensure the lid member and the base member are magnetically held together by the lid magnet and the base magnet when the laptop is in the closed position.

Figure 7:
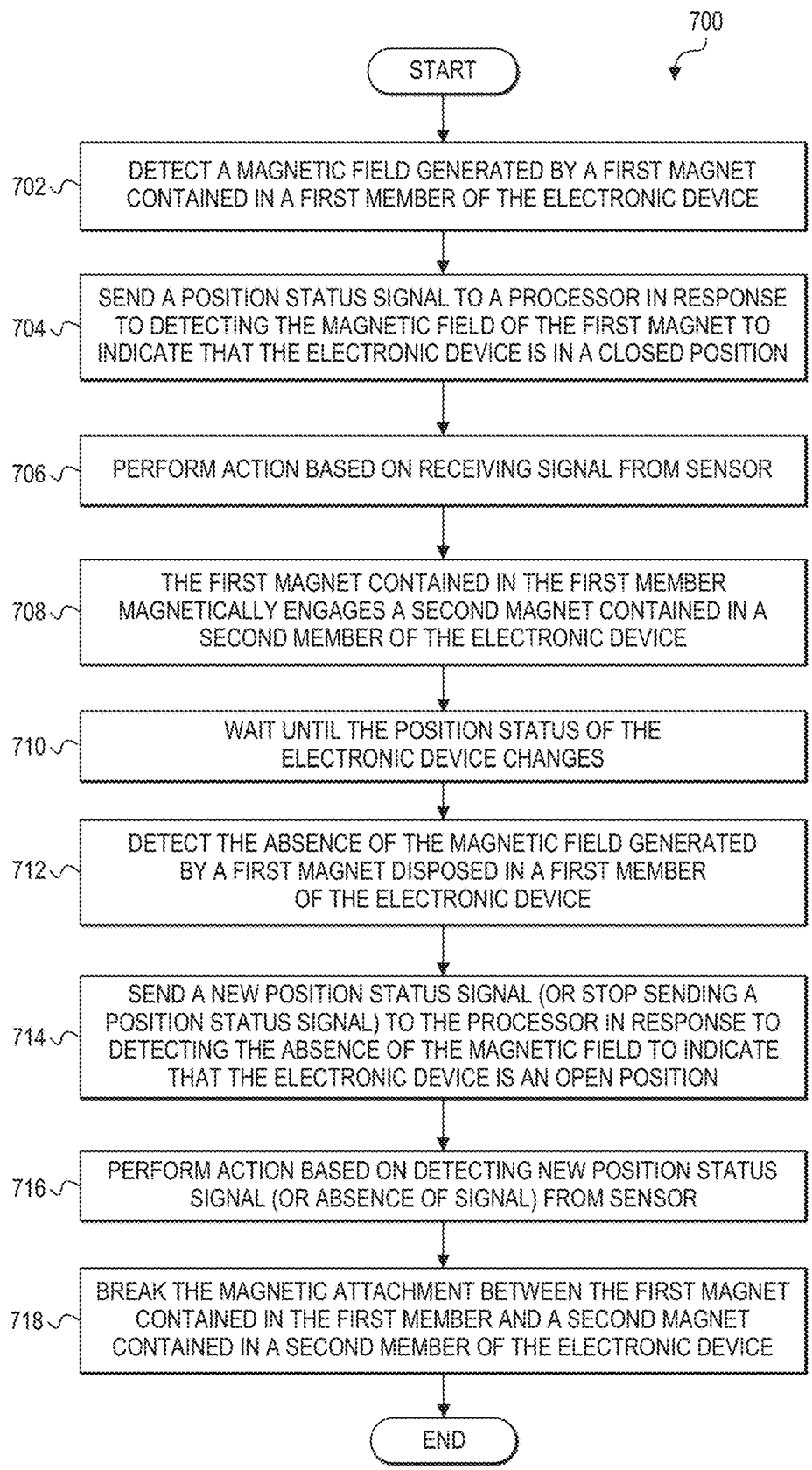
FIG. 7 is a high-level flowchart of an example technique for using an electronic device implementing an improved locking and position status detection scheme according to an embodiment.

FIG. 7 is a high-level flowchart 700 illustrating example operations and activities that may occur in an electronic device incorporating an improved locking and position status detection scheme, such as disclosed herein. In one example, operations and techniques of flowchart may occur in an electronic device such as laptop computer 300.

For instance, at 702, a magnetic field generated by a first magnet contained in a first member of an electronic device may be detected by a sensor contained in a second member of the electronic device. This may occur when the space between the first magnet and the sensor decreases as the first member moves or is moved toward the second member or vice versa. In the example of a laptop, the detection may occur as a lid member (e.g., 310) is closed by rotating the lid member of the laptop toward a base member (e.g., 320) of the laptop (or vice versa) about a hinge (e.g., 305) that rotatably connects opposing ends of the lid member and the base member.

At 704, the sensor may send a signal to a processor of the electronic device in response to detecting the magnetic field of the first magnet. The signal may indicate the position status of the members of the electronic device relative to each other. In the example of a laptop, the signal may indicate that the electronic device is in a closed position in which an inner surface (e.g., 311) of the lid member is substantially adjacent and parallel to a top surface (e.g., 321) of the base member.

At 706, an action may be performed by the processor of the electronic device based on receiving the position status signal from the sensor indicating that the electronic device is in a closed position. In the example of a laptop, the signal may indicate that the electronic device is closed and therefore, the processor may initiate a sleep state for the laptop when the signal is received.

At 708, the first magnet in the first member engages a second magnet in the second member to magnetically hold the first member to the second member with opposing surfaces of the members in substantially parallel alignment. This first and second magnets may be attracted to each other and engage when the space between the first magnet and the second magnet decreases as the first member is moved toward the second member or vice versa. In the example of a laptop, the attraction and engagement may result from the lid member of the laptop being rotated toward the base member of the laptop (or vice versa) about the hinge that rotatably connects the lid member and the base member. The first magnet (e.g., 314) may have one pole (e.g., South pole) that opposes an opposite pole (e.g., North pole) of the second magnet (e.g., 324) when the electronic device is closed and the inner surface of the lid member is substantially adjacent and parallel to the top surface of the base member.

At 710, the electronic device may remain locked, and the action performed at 706 may continue to be performed, until the position status of the electronic device changes. Generally, when the position status changes, the sensor sends another signal (or refrains from sending a signal depending on the particular configuration of the sensor) to the processor of the electronic device.

At 712, the absence of the magnetic field generated by the first magnet contained in the first member of the electronic device may cause the sensor contained in the second member of the electronic device to stop outputting a signal to the processor. In other sensor configurations, the absence of the magnetic field may cause the sensor to output a different signal to the processor. The absence of the magnetic field generated by the first magnet may occur when the space between the first magnet and the sensor increases as the first member moves or is moved away from the second member or vice versa. In the example of a laptop, this may occur as the lid member is opened by rotating one end of the lid member of the laptop away from an opposing end of the base member of the laptop (or vice versa) about the hinge that rotatably connects other opposing ends of the lid member and the base member.

At 714, the sensor sends a new position status signal to a processor of the electronic device (or refrains from sending a position status signal) in response to detecting the absence of the magnetic field from the first magnet. The new position status signal (or absence thereof) may indicate the position status of the members of the electronic device relative to each other. In the example of a laptop, the new position status signal (or absence thereof) may indicate that the electronic device is in an open position in which the lid member and the base member define an angle that sufficiently separates the first magnet and the sensor to prevent the sensor from detecting the magnetic field generated by the first magnet.

At 716, an action may be performed by the processor of the electronic device based on detecting the absence of a signal or on receiving the new position status signal from the sensor indicating that the electronic device is in an open position. In the example of a laptop, the processor may initiate a working state for the laptop when the new position status signal (or absence thereof) is detected.

At 718, the magnetic engagement between the first magnet contained in the first member and the second magnet contained in the second member is broken. This may occur when the space between the first magnet and the second magnet increases as the first member moves or is moved away from the second member or vice versa. In the example of a laptop, the disengagement between the magnets may result from the one end of the lid member of the laptop being rotated away from the opposing end of the base member of the laptop (or vice versa) about the hinge that rotatably connects the other opposing ends of the lid member and the base member.

The teachings in this specification can be generally applied to any device, system, or apparatus where there is an internal or external first member to be attached, locked or otherwise held adjacent to another member when the members are in a certain position and where detection of the position (and optionally, differentiation between multiple positions) is desired. In one nonlimiting example illustrated in FIGS. 8A-8C, these teachings can be extended to dual display devices that generally use an external accessory such as a keyboard. User experience studies indicate that a keyboard facilitates higher productivity compared to touch-screen-based typing as the keyboard gives better typing feedback. Hence, generally, a dual display device may have a provision to attach an external keyboard on a secondary display screen of the dual display device. In at least one embodiment, the external keyboard is to be securely attached to the secondary display screen and the position of the external keyboard on the secondary display screen is to be detected and identified in order to switch the secondary display screen into a suitable form.

FIGS. 8A-8C are schematic diagrams of a dual display computer 800 implementing a locking and position status detection scheme for an external accessory 830 (e.g., a keyboard) according to an embodiment. FIG. 8A is a schematic plan view of dual display computer 800 without the external accessory being attached. Dual display computer 800 includes a first display member 810 connected to a second display member 820, where the connection between the first display member and the second display member may allow rotatable movement of the members relative to one another around or about an axis. The axis may be defined by a connection point 805 in the form of a hinge that rotatably connects one end (e.g., bottom or south end) of first display member 810 to one end (e.g., top or north end) of second display member 820.

First display member 810 may include a primary display screen 818 that is visible through a top surface 811 of first display member 810 and may also include a first bezel area 812 partially or fully surrounding the primary display screen 818. First bezel area 812 may be defined between edges of the primary display screen and a perimeter of the first display member. The second display member 820 may include a secondary display screen 828 visible through a top surface 821 of second display member 820 and may also include a second bezel area 822 partially or fully surrounding secondary display screen 828. Bezel area 822 may be defined between edges of the secondary display screen and a perimeter of the second display member. In one example, top surface 821 could be a glass cover, tempered glass cover, or any other suitable material through which the secondary display screen 828 can be viewed and which may optionally be used to implement touchscreen capabilities. Top surface 821 may be a single surface extending across the bezel area and the secondary display screen. Alternatively, top surface 821 may include a combination of two or more separate surfaces. For example, the bezel area may have one surface of any suitable material, and the secondary display screen may have a separate surface of any suitable material. Inner surface 811 of first display member 310 may be similarly configured.

In at least one embodiment of a dual display computer, multiple display member magnets and corresponding sensors are contained in the bezel area of one of the display members. In the example shown in FIG. 8A, display member magnets 824A, 824B, and 824C and respective sensors 826A, 826B, and 826C are disposed in the bezel area 822 of the left (or west) side of second display member 820, and display member magnets 824D, 824E, and 824F and respective sensors 826D, 826E, and 826F are disposed in the bezel area 822 of the right (or east) side of second display member 820. In at least one embodiment sensor and display member magnet pairs in second display member 820 may have the same or similar configuration, position, and/or orientation as sensor 326 and base magnet 324 in base member 320 of laptop computer 300 shown in FIGS. 3 and 4A-4B.

FIGS. 8B-8C are schematic plan views of dual display computer 800 with external accessory 830 attached to second display member 820. In one example, external accessory 830 is a keyboard. In other embodiments, however, the external accessory 830 could be any other desirable accessory such as a touchpad, a keyboard and touchpad combination, a tertiary display screen, or any other suitable accessory that can be utilized in multiple positions on a member of a computing device, etc.

Position status detection of the external accessory 830 can be achieved using magnets and sensors (e.g., Hall sensors). In conventional approaches, an array of magnets and Hall sensors could be used to achieve the detection of an external keyboard. In an approach using a conventional locking and position status detection scheme, a first set of magnets in the external accessory could be used for the sensors in the second display screen to detect the position status of the external accessory. In addition, a second set of magnets in the external accessory could be used to attach to a set of magnets in the second display screen to magnetically hold the external accessory to the second display screen.

The locking and detection scheme described herein, however, can reduce the number of magnets needed on an external keyboard (or other accessory) side to half. For example, accessory magnets 834A, 834B, 834C, and 834D may be contained in external accessory 830 in positions that align with respective magnet and sensor pairs contained in bezel area 822 of second display member 820, depending on the position of the external accessory (e.g., on north/upper side of secondary display screen 828 or south/lower side of secondary display screen 828). This may not only help in making the device simpler, but also can reduce magnetic interference to audio, RF antennae, etc. as there are fewer magnets compared to a traditional implementation.

In at least one embodiment, external accessory 830 is to be magnetically attached or held to second display member 820 in one or more positions. For example, external accessory 830 may be longitudinally movable relative to second display member 820 between an upper (north) end and a lower (south) end of the second display member. Magnets in the external accessory (e.g., 834A-834D) and magnets in the second display member (e.g., 824A-824F) can align and engage to magnetically hold the external accessory to the second display member in one or more positions.

The position status of external accessory 830 relative to second display member 820 is to be detected and identified in order to switch the secondary display screen 828 into a suitable form based on the position status of the external accessory. External accessory 830 can include multiple magnets to form a magnetic attachment to display member magnets in second display member 820. For example, accessory magnets 834A and 834B may be disposed on a left (or west) side of external accessory 830, and accessory magnets 834C and 834D may be disposed on a right (or east) side of external accessory 830. The accessory magnets 834A and 834B are spaced to align with adjacent pairs of display member magnets and sensors in the bezel area 822 of the left side of second display member 820, depending on the position of external accessory 830. Similarly, accessory magnets 834C and 834D are spaced to align with adjacent pairs of display member magnets and sensors in the bezel area 822 of the right side of second display member 820, depending on the position of external accessory 830. In at least one embodiment accessory magnets 834A-834D may have the same or similar configuration, position, and/or orientation as lid magnet 314 in lid member 310 of laptop computer 300 shown in FIGS. 3 and 4A-4B.

In FIG. 8B, external accessory 830 is positioned substantially adjacent and parallel to the lower (or south) side of secondary display screen 828. This placement leaves an upper exposed portion of secondary display screen 828 (e.g., on the north side of the secondary display screen). In at least one embodiment, the upper exposed portion may be transitioned by a processor of dual display computer 800 to serve as a small secondary display screen 828A to which data is provided for display by the processor. This prevents data from being displayed in the lower portion of the secondary display screen that is covered by the external accessory. In at least one embodiment, the accessory magnets trigger respective sensors and also engage respective display member magnets to magnetically lock or hold the external accessory in the lower position shown in FIG. 8B. For example, accessory magnets 834A and 834B may trigger sensors 826B and 826C, respectively, and engage display member magnets 824B and 824C, respectively, to magnetically lock or hold the external accessory in the lower position. Similarly, accessory magnets 834C and 834D may trigger sensors 826E and 826F, respectively, and engage display member magnets 824E and 824F, respectively, to magnetically lock or hold the external accessory in the lower position.

In FIG. 8C, the external accessory 830 is positioned substantially adjacent and parallel to the upper (or north) side of secondary display screen 828. This placement leaves a lower exposed portion of secondary display screen 828 (e.g., on the south side of the secondary display screen). In at least one embodiment, the lower exposed portion may transition to become a touchpad 828B, optionally with one or two small screens adjacent to the touchpad. In at least one embodiment, the accessory magnets trigger respective sensors and also engage respective display member magnets to magnetically lock or hold the external accessory in the upper position shown in FIG. 8C. For example, accessory magnets 834A and 834B may trigger sensors 826A and 826B, respectively, and engage display member magnets 824A and 824B, respectively, to magnetically lock or hold the external accessory in the upper position. Similarly, accessory magnets 834C and 834D may trigger sensors 826D and 826E, respectively, and engage display member magnets 824D and 824E, respectively, to magnetically lock or hold the external accessory in the upper position.

The particular combination of sensors that detect accessory magnets may determine how the processor transitions secondary display screen 828 for use. For example, when the four sensors (e.g., 826A, 826B, 826D, and 826E) closest to the top (north) end of second display member 820 each detect an accessory magnet, then secondary display screen 828 may transition to a touchpad 828B, optionally with adjacent screens. When the four sensors (e.g., 826B, 826C, 826E, and 826F) closest to the lower (south) end of second display member 820 each detect an accessory magnet, then secondary display screen 828 may transition to small secondary display screen 828A. It should be apparent, however, that any other suitable alternative use may be configured for an exposed portion of secondary display screen 828 when an external accessory is used, and the embodiments described herein are intended to be nonlimiting examples for illustration purposes.

Figure 9A:
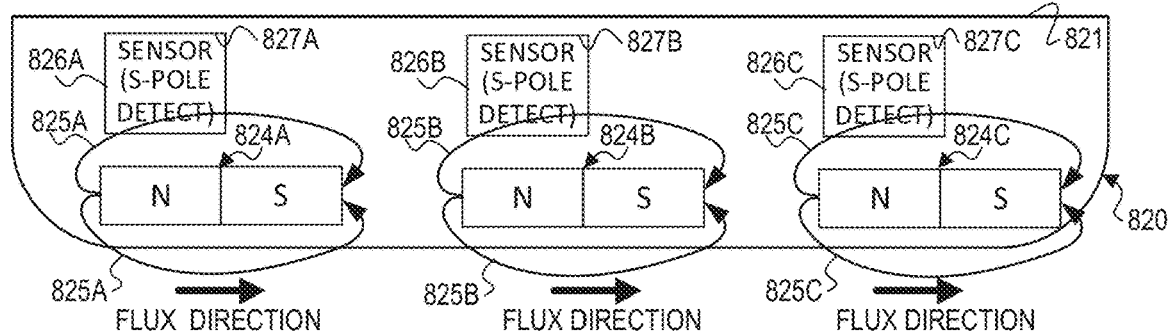
FIG. 9A is a simplified block diagram illustrating a side view of one display member of the dual display computing device of FIG. 8A according to an embodiment.

FIG. 9A is a schematic left (west) side view of second display member 820 of dual display computer 800 without an external accessory attached, according to at least one embodiment. Display member magnets 824A-824C are contained in second display member 820 along with sensors 826A-826C, which are positioned above at least a portion of respective display member magnets 824A-824C. When the external accessory is not attached to dual display computer 800, external accessory magnets 834A-834D are not aligned with any sensors (e.g., 826A, 826B, 826C, 826D, 826E, 826F) in the second display member. In at least one embodiment, sensors 826A-826C may be configured to detect a magnetic field with flux lines that are perpendicular to a detection mechanism of the sensor. In one example, sensors 826A-826C may be implemented as Hall sensors. However, any other sensor or switch that detects a magnetic field and produces an output signal in response to the detection (or absence of detection) may be used.

In an embodiment, sensors 826A-826C may be configured with top layers 827A-827C that detect magnetic fields running perpendicular to the top layers. Each sensor 826A-826C may be oriented such that its top layer 827A-827C is at least substantially parallel to top surface 821 of second display member 820, and therefore, substantially parallel to a bottom surface of the external accessory 830 when the external accessory member is magnetically attached to the second display member. The configuration and orientation of display member magnets 824A-824C can be selected to produce magnetic fields with lines of flux 825A-825C that are generally parallel, rather than perpendicular, to the detection mechanisms (e.g., top layers 827A-827C) of the sensors. Thus, display member magnets 824A-824C may be oriented to prevent detection of their magnetic fields by their respective adjacent sensors 826A-826C.

In one example, display member magnet 824A could be an axially magnetized bar magnet that is longitudinally oriented in second display member 820 to produce the magnetic field with lines of flux 825A that are generally parallel to the top layer 827A of sensor 826A. Thus, sensor 826A is not triggered by the magnetic field of display member magnet 824A. Additionally, display member magnet 824A may be positioned such that its north pole (N) is adjacent to and below sensor 826A. This enables a single accessory magnet (e.g., 834A) to function as a trigger for sensor 826A and to magnetically engage display member magnet 824A. The other display member magnets 824B and 824C shown in FIGS. 9A-9C may be similarly configured and positioned in the left (or west) side of bezel area 822 of second display member 820. Although not shown in FIGS. 9A-9C, additional display member magnets 824D-824F may be similarly configured and positioned in the bezel area 822 on the opposite (e.g., right or east) side of second display member 820.

Figure 9B:
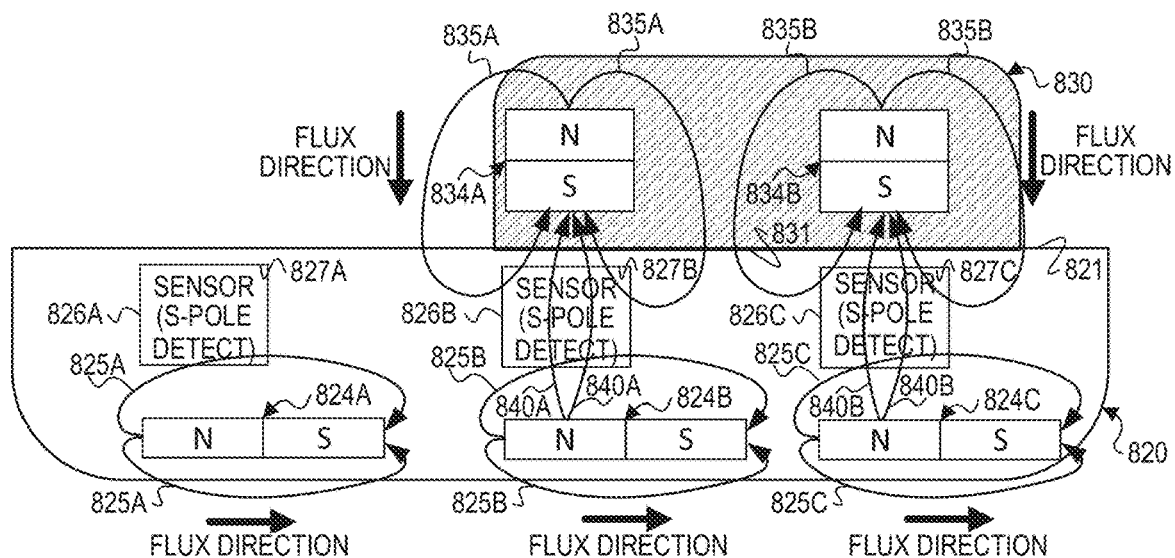
FIG. 9B is a simplified block diagram illustrating a side view of the external accessory attached to the one display member of the dual display computing device of FIG. 8B in one example position according to an embodiment.

FIG. 9B is a schematic side view of external accessory 830 and second display member 820 of dual display computer 800 when the external accessory is in a first (e.g., lower) position. In the lower position, a bottom surface 831 of external accessory 830 opposes a lower portion of the top surface 821 of second display member 820 and is at least substantially parallel and adjacent to the lower portion of the top surface of the second display member. In at least some embodiments, bottom surface 831 abuts the lower portion of top surface 821 when the external accessory is magnetically engaged with the second display member in the lower position. In other embodiments, a slight spacing may separate the bottom surface 831 from the lower portion of top surface 821 when the external accessory is magnetically engaged with the second display member in the lower position (e.g., if left and right side edge ridges/recesses on either the external accessory or the second display member are provided to guide the longitudinal movement of the external accessory). Adjacent accessory magnets on the left (or west) side of external accessory 830 are arranged to be aligned with adjacent sensor and display member magnet pairs on the left (or west) side of second display member 820. Accordingly, when the external accessory is in the lower position as shown in FIG. 9B, accessory magnet 834A is aligned with sensor 826B and a portion (e.g., north pole) of display member magnet 824B such that sensor 826B is positioned between accessory magnet 834A and the portion of display member magnet 824B. Accessory magnet 834B is aligned with sensor 826C and a portion (e.g., north pole) of display member magnet 824C such that sensor 826C is positioned between accessory magnet 834B and the portion of display member magnet 824C.

Accessory magnets 834A and 834B are further configured and arranged to produce magnetic fields with lines of flux 835A and 835B, respectively, that are perpendicular to bottom surface 831 of external accessory 830. Thus, the magnetic fields run perpendicular to top layers 827B and 827C of sensors 826B and 826C, respectively, when the external accessory is in the lower position. For example, accessory magnet 834A includes a north pole (N) and a south pole (S) and is oriented for the south pole (S) to be aligned with and facing toward sensor 826B when the external accessory is in the lower position. Similarly, accessory magnet 834B includes a north pole (N) and a south pole (S) and is oriented for the south pole (S) to be aligned with and facing toward sensor 826C when the external accessory is in the lower position.

When the external accessory is in the lower position as shown in FIG. 9B, the south poles (S) of accessory magnets 834A and 834B and the north poles (N) of display member magnets 824B and 824C engage at 840A and 840B, respectively, to magnetically hold the external accessory and the second display member together in substantially parallel alignment. Thus, the external accessory may remain in the lower position until an appropriate amount of force is applied to separate the magnets by slidably moving the external accessory in a longitudinal direction (or in a vertical direction for example, when removing the external accessory from the dual display computer). It should be apparent that accessory magnets 834C and 834D (not shown in FIG. 9B) on the right (or east) side of external accessory 830 may be similarly arranged for interaction with sensors 826E and 826F, respectively, and their adjacent display member magnets 824E and 824F.

Additionally, when the external accessory is in the lower position as shown in FIG. 9B, sensor 826B detects the magnetic field of accessory magnet 834A, and sensor 826C detects the magnetic field of accessory magnet 834B. Sensors 826B-826C (and 826E-826F, not shown) can provide a position status signal to a processor of dual display computer 800 to indicate that the external accessory is in the lower position. When the external accessory is moved away from the lower position, sensors 826B-826C (and 826E-826F, not shown) may no longer detect the magnetic fields of the appropriate accessory magnets that indicate that the accessory is in the lower position. In at least one embodiment, sensors 826B-826C (and 826E-826F, not shown) may stop sending position status signals to the processor as an indication that the external accessory is not in the lower position. In some cases, the processor can use the position status signals from the particular combination of sensors 826B-826C (and 826E-826F, not shown), and/or the lack of position status signals, to determine an appropriate action to take. In one example scenario, receiving position status signals from the combination of sensors 826B, 826C, 826E, and 826F indicates the external accessory is in the lower position. Accordingly, the processor may cause the upper exposed portion of the secondary display screen to operate as a small secondary display screen 828A.

Figure 9C:
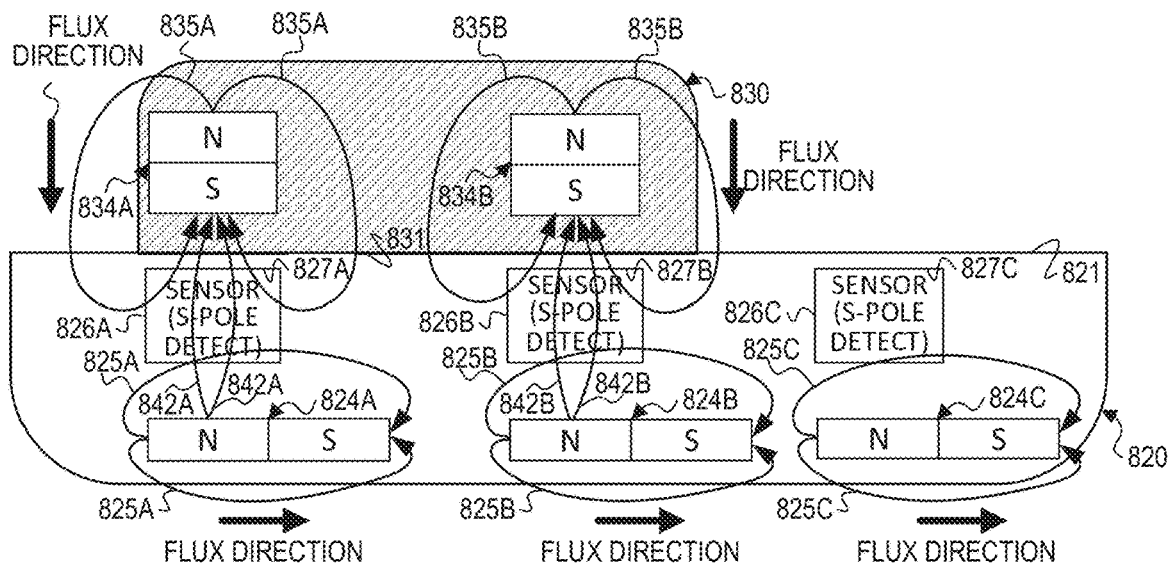
FIG. 9C is a simplified block diagram illustrating a side view of the external accessory attached to the one display member of the dual display computing device of FIG. 8C in another example position according to an embodiment.

FIG. 9C is a schematic side view of external accessory 830 and second display member 820 of dual display computer 800 when the external accessory is in a second (e.g., upper) position. In the upper position, the bottom surface 831 of external accessory 830 opposes an upper portion of the top surface 821 of second display member 820 and is at least substantially parallel and adjacent to the upper portion of the top surface of the second display member. In at least some embodiments, bottom surface 831 abuts the upper portion of top surface 821 when the external accessory is magnetically engaged with the second display member in the upper position. In other embodiments, a slight spacing may separate the bottom surface 831 from the upper portion of top surface 821 when the external accessory is magnetically engaged with the second display member in the upper position (e.g., if left and right side edge ridges/recesses on either the external accessory or the second display member are provided to guide the longitudinal movement of the external accessory). In this example, when the external accessory is in the upper position as shown in FIG. 9C, accessory magnet 834A is aligned with sensor 826A and a portion (e.g., north pole) of display member magnet 824A such that sensor 826A is positioned between accessory magnet 834A and the portion of display member magnet 824A. Accessory magnet 834B is aligned with sensor 826B and a portion (e.g., north pole) of display member magnet 824B such that sensor 826B is positioned between accessory magnet 834B and the portion of display member magnet 824B.

The magnetic fields of accessory magnets 834A and 834B run perpendicular to top layers 827A and 827B of sensors 826A and 826B, respectively, when the external accessory is in the lower position. In this example, accessory magnet 834A is oriented for the south pole (S) of accessory magnet 834A to be aligned with and facing toward sensor 826A when the external accessory is in the upper position. Similarly, accessory magnet 834B is oriented for the south pole (S) of accessory magnet 834B to be aligned with and facing toward sensor 826B when the external accessory is in the upper position.

When the external accessory is in the upper position as shown in FIG. 9C, the south poles (S) of accessory magnets 834A and 834B and the north poles (N) of display member magnets 824A and 824B engage at 842A and 842B, respectively, to magnetically hold the external accessory and the second display member together in substantially parallel alignment. Thus, the external accessory may remain in the upper position until an appropriate amount of force is applied to separate the magnets by slidably moving the external accessory in a longitudinal direction (or in a vertical direction for example, when removing the external accessory from the dual display computer). It should be apparent that accessory magnets 834C and 834D (not shown in FIG. 9C) on the right (or east) side of external accessory 830 may be similarly arranged for interaction with sensors 826D and 826E, respectively, and their adjacent display member magnets 824D and 824E.

Additionally, when the external accessory is in the upper position as shown in FIG. 9C, sensor 826A detects the magnetic field of accessory magnet 834A, and sensor 826B detects the magnetic field of accessory magnet 834B. Sensors 826A-826B (and 826D-826E, not shown) can provide a position status signal to a processor of dual display computer 800 to indicate that the external accessory is in the upper position. When the external accessory is moved away from the upper position, sensors 826A-826B (and 826D-826E, not shown) may no longer detect the magnetic fields of the appropriate accessory magnets that indicate that the external accessory is in the upper position. In at least one embodiment, sensors 826A-826B (and 826D-826E, not shown) may stop sending position status signals to the processor as an indication that the external accessory is not in the upper position. In some cases, the processor can use the position status signals from the particular combination of sensors 826A-826B (and 826D-826E, not shown), and/or the lack of position status signals, to determine an appropriate action to take. In one example scenario, receiving position status signals from the combination of sensors 826A, 826B, 826D, and 826E indicates the accessory is in the upper position. Accordingly, the processor may cause the lower exposed portion of the secondary display screen to operate as a touchpad, a touchpad and adjacent screens 828B, a small screen, or any other suitable alternative use.

It should be apparent that the nonlimiting illustrations and examples provided herein may be modified or changed in any number of ways. For example, greater or fewer display member magnets with corresponding sensors and accessory magnets may be provided in the appropriate place to allow any suitable external accessory to be magnetically attached to a display member in one, two, or more different positions. Furthermore, it should be apparent that the embodiments described herein may be combined in any suitable way. For example, a lid magnet (e.g., 314) could be used in a dual display device (e.g., 800) to close the device when an external accessory (e.g., 830) is removed. The lid magnet could be positioned to align with any of the second display member magnets (e.g., 824A-824F) and corresponding sensors (e.g., 826A-826F).

As used herein, the term 'contained' and 'disposed' as used herein with reference to an object that is contained in or by another object, or that is disposed in another object, are intended to mean that the object (e.g., lid magnet 314, base magnet 324, sensor 326, second display member magnets 824A-824F, sensors 826A-826F, accessory magnets 834A-834D, etc.) may be embedded in, integrated with, affixed to, attached to, connected to, or otherwise included in the other object (e.g., lid member 310, base member 320, first display member 810, second display member 820, external accessory 830, etc.).

Figure 10:
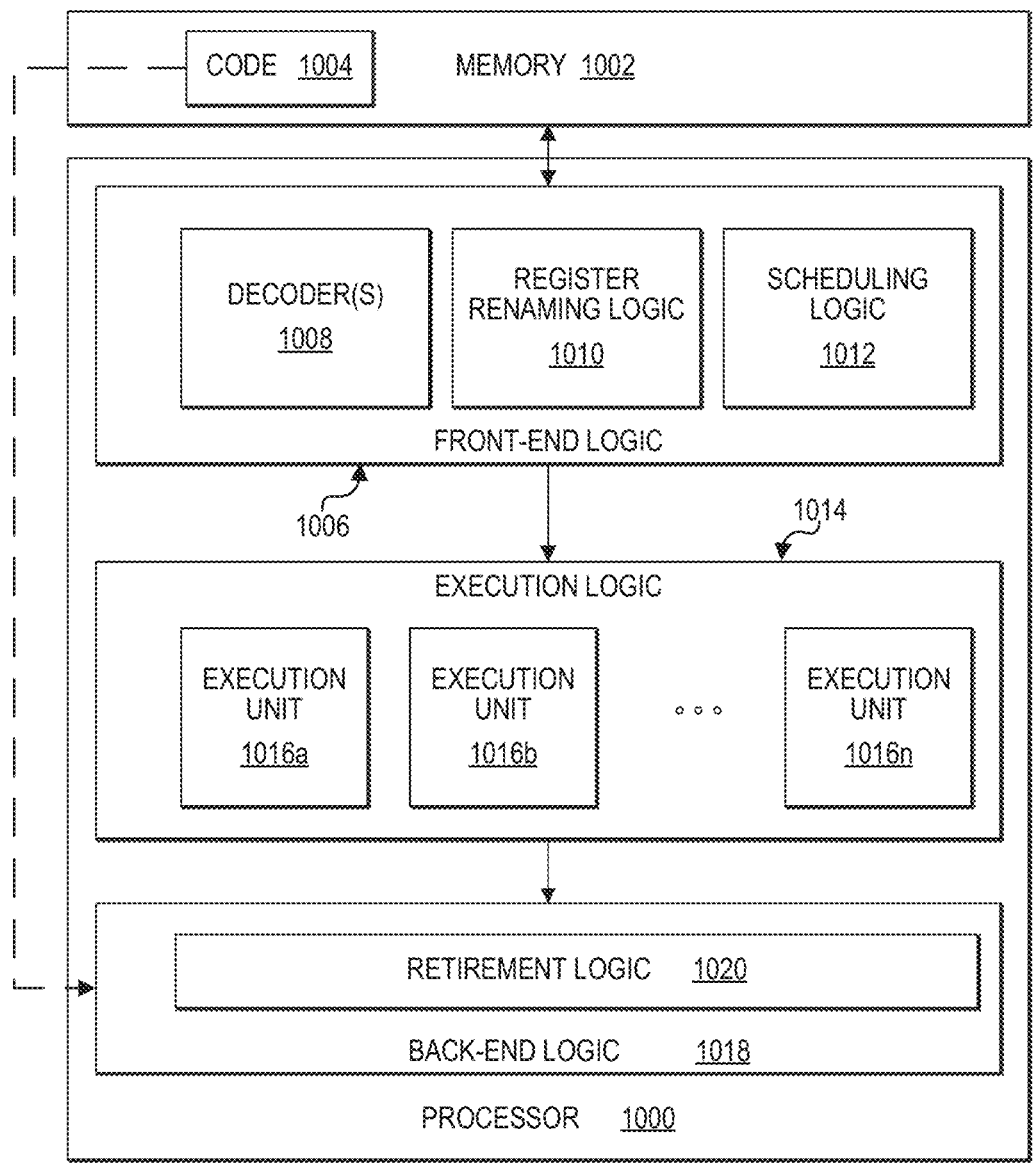
FIG. 10 is a block diagram of an exemplary processor in accordance with one embodiment.
Figure 11:
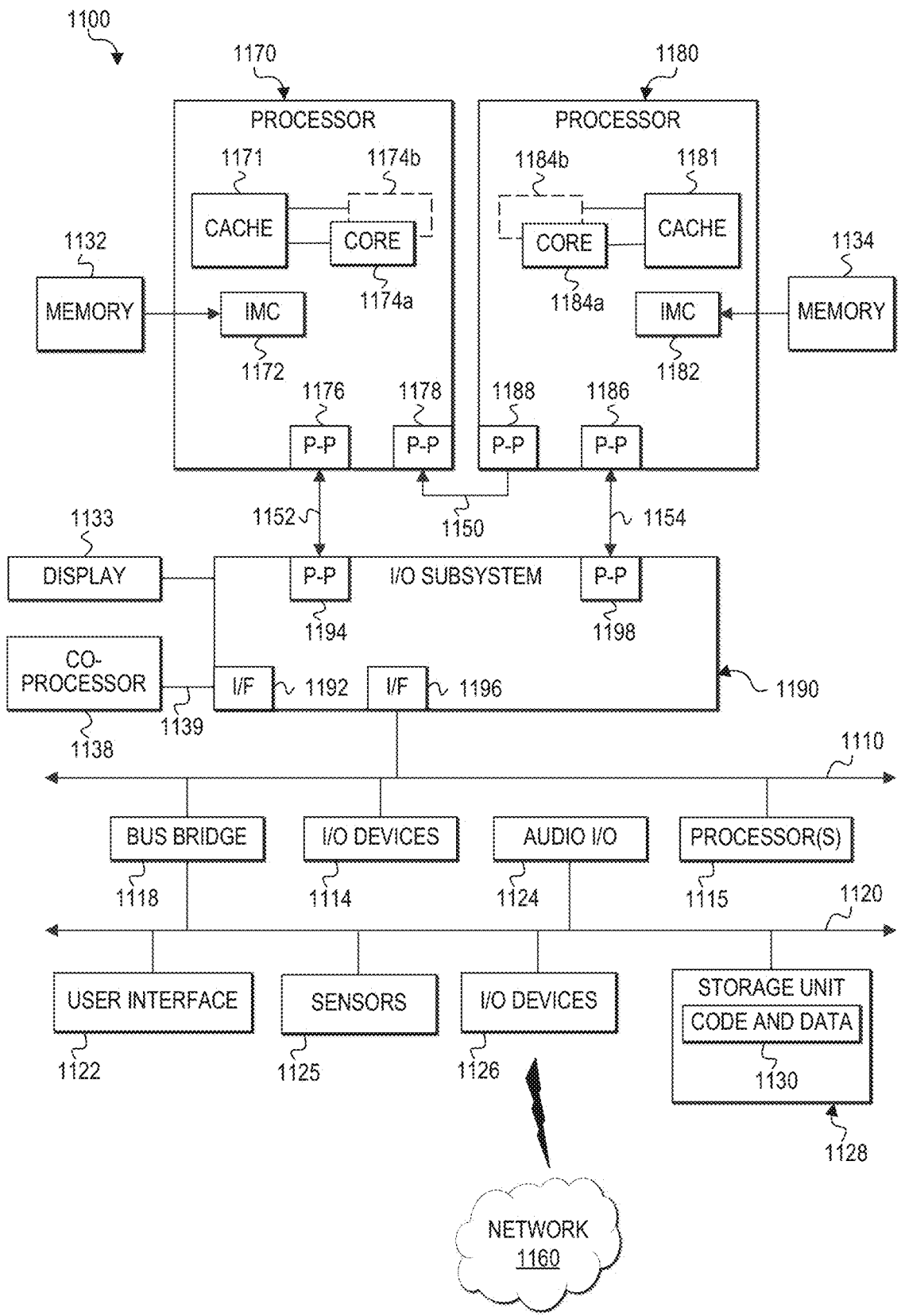
FIG. 11 is a block diagram of an exemplary computing system in accordance with one embodiment.

FIGS. 10-11 are block diagrams of example computer architectures that may be connected to, embedded with, or otherwise interoperate with the locking and position status detection scheme in accordance with embodiments disclosed herein. Other computer architecture designs known in the art for processors and computing systems may also be used. Generally, suitable computer architectures for embodiments disclosed herein can include, but are not limited to, configurations illustrated in FIGS. 10-11.

FIG. 10 is an example illustration of a processor according to an embodiment. Processor 1000 is an example of a type of hardware device that can be used in connection with the implementations shown and described herein (e.g., processor of laptop computer 300, processor of dual display computer 800) above. Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

In an example implementation, processor 1000 could be used in connection with a processor of laptop computer 300 and be operatively connected to sensor 314 for receiving position status signals indicating whether the lid member is in an open position or a closed position. Code 1004 could be executed to identify whether the signal indicates the lid member is in an open position or a closed position, and to control the state of the laptop computer. For example, the laptop computer can be transitioned to a working state (e.g., if the lid member is open) that allows user interaction or in a sleep state (e.g., if the lid member is closed) where applications are not active and power is conserved. In another example, processor 1000 could be used in connection with a processor of laptop computer 800 and be operatively connected to sensors 826A-826F for receiving position status signals, where the combination of signals from a particular group of sensors (or lack of signals) indicates the position of external accessory 830. Code 1004 could be executed to identify which combination of sensors generated a set of received signals and to identify the position of the external accessory based on the identified combination of sensors. Code 1004 may also be executed to control the state or form of the second display screen 828 and transition it according to the identified position of the external accessory. In other examples, hardware, firmware, or any combination of hardware, firmware, and code 1004 of processor 1000 may be used to perform these activities.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the electronic devices (e.g., laptop computer 300, dual display computer 800) described herein may be configured in the same or similar manner as computing system 1100.

Processors 1170 and 1180 may be implemented as single core processors 1174a and 1184a or multi-core processors 1174a-1174b and 1184a-1184b. Processors 1170 and 1180 may each include a cache 1171 and 1181 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1100. Moreover, processors 1170 and 1180 are examples of the types of hardware that can be used in connection with the implementations shown and described herein (e.g., laptop computer 300, dual display computer 800).

Processors 1170 and 1180 may also each include integrated memory controller logic (IMC) 1172 and 1182 to communicate with memory elements 1132 and 1134. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures. Processors 1170 and 1180 may exchange data via a point-to-point (PtP) interface 1150 using point-to-point interface circuits 1178 and 1188, respectively. Processors 1170 and 1180 may each exchange data with an I/O subsystem 1190 via individual point-to-point interfaces 1152 and 1154 using point-to-point interface circuits 1176, 1186, 1194, and 1198. I/O subsystem 1190 may also exchange data with a co-processor 1138, such as a high-performance graphics circuit, machine learning accelerator, or other co-processor 1138, via an interface 1139, which could be a PtP interface circuit. In alternative embodiments, any or all of the PtP links illustrated in FIG. 11 could be implemented as a multi-drop bus rather than a PtP link.

I/O subsystem 1190 may be in communication with a bus 1110 via an interface circuit 1196. Bus 1120 may have one or more devices that communicate over it, such as a bus bridge 1118, I/O devices 1116, and potentially other processors 1115. Via a bus 1110, bus bridge 1118 may be in communication with other devices such as a user interface 1112 (such as a keyboard, mouse, touchscreen, or other input devices), one or more sensors 1125 (e.g., sensors 326, 826A-826F), I/O devices 1126 (such as modems, network interface devices, or other types of communication devices that may communicate through a computer network 1160), audio I/O devices 1114, and/or a data storage unit 1128. Data storage unit 1128 may store code 1130, which may be executed by processors 1170 and/or 1180. In alternative embodiments, any portions of the bus architectures could be implemented with one or more PtP links.

The computer system depicted in FIG. 11 is a schematic illustration of an embodiment of a computing system that may be utilized to implement various embodiments discussed herein. For example, processors 1170 and/or 1180 could be used in connection with a processor of laptop computer 300 or a processor of dual display device 800 and be operatively connected to an appropriate sensor or sensors (e.g., 326, 826A-826F). Furthermore, in at least one example, processors 1170 and/or 1180 could be implemented using processor 1000. It will be appreciated that various components of the system depicted in FIG. 11 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any subject matter or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

OTHER NOTES AND EXAMPLES

The following examples pertain to embodiments in accordance with this specification. The system, apparatus, method, and machine readable medium embodiments can include one or a combination of the following examples:

Example A1 provides an apparatus, a system, a processor, a machine readable medium, a method, and/or hardware-, firmware-, and/or software-based logic, where the Example of A1 includes a first member with a first surface, the first member comprising a first magnet configured to produce a first magnetic field and also includes a second member with a second surface, where the first member is movable relative to the second member. The second member comprises a sensor operatively connected to a processor; and a second magnet adjacent to the sensor, where in a first position, the first magnet and the second magnet are engaged to magnetically hold the first member to the second member such that at least a portion of the first surface of the first member opposes at least a portion of the second surface of the second member, and the sensor is to detect the first magnetic field produced by the first magnet and is to send a signal to the processor in response to detecting the first magnetic field produced by the first magnet.

In Example A2, the subject matter of Example A1 can optionally include where the second magnet is oriented relative to the sensor to produce a second magnetic field that is undetectable by the sensor.

In Example A3, the subject matter of any one of Examples A1-A2 can optionally include where the first magnet is oriented such that the first magnetic field runs perpendicular to the first surface of the first member, and where the second magnet is oriented such that the second magnetic field produced by the second magnet runs parallel to the second surface of the second member.

In Example A4, the subject matter of any one of Examples A1-A3 can optionally include where the first magnet and the second magnet are selected from a group of magnets, the group of magnets including a bar magnet, a cylindrical magnet, and a disk magnet.

In Example A5, the subject matter of any one of Examples A1-A4 can optionally include where the first member comprises a first display screen with an edge spaced from an end of the first member; and a first bezel area between the edge of the first display screen and the end of the first member, where the first magnet is contained in the first bezel area.

In Example A6, the subject matter of any one of Examples A1-A5 can optionally include where the second member comprises: a second display screen with an edge spaced from an end of the second member; and a second bezel area between the edge of the second display screen and the end of the second member, where the sensor and the second magnet are contained in the second bezel area.

In Example A7, the subject matter of any one of Examples A1-A6 can optionally include where the processor is to change from a working state to a sleep state when the first member is moved from a second position to the first position.

In Example A8, the subject matter of any one of Examples A1-A7 can optionally include a mechanical attachment component connecting a first end of the first member and a second end of the second member and defining a fixed axis of rotation about which at least the first member is rotatable.

In Example A9, the subject matter of any one of Examples A1-A8 can optionally include where in a second position, the first surface of the first member and the second surface of the second member define an angle sufficient to prevent attraction between the first magnet and the second magnet, and the sensor is to stop detecting the first magnetic field produced by the first magnet and is to stop sending signals to the processor.

In Example A10, the subject matter of any one of Examples A1-A4 or A6 can optionally include where the first member is slidably movable in a longitudinal direction relative to the second member.

In Example A11, the subject matter of any one of Examples A1-A4, A6, or A10 can optionally include where the second member further comprises: a second display screen, where in the first position, the first member covers a lower section of the second display screen, and where the processor is to, in response to receiving the signal from the sensor, prevent data from being displayed in the lower section of the second display screen and provide data for display in an upper exposed section of the second display screen.

In Example A12, the subject matter of any one of Examples A1-A4, A6, A10, or 11 can optionally include where the second member further comprises a second sensor disposed in the second member and operatively connected to the processor, and a third magnet adjacent to the second sensor, where in a second position, the first magnet and the third magnet are engaged to magnetically hold the first member to the second member such that the first surface of the first member opposes a second portion of the second surface of the second member, and the second sensor is to detect the first magnetic field produced by the first magnet and is to send a second signal to the processor in response to detecting the first magnetic field produced by the first magnet.

In Example A13, the subject matter of Example A12 can optionally include where the second member further comprises: a second display screen, where in a second position, the first member covers an upper section of the second display screen, and where the processor is to, in response to receiving the second signal from the second sensor, prevent data from being displayed in the upper section of the second display screen and configure a lower section of the second display screen for an alternative use.

Example M1 provides a method, where the Example of M1 comprises: magnetically holding a first member of a computing device to a second member of the computing device in a first position such that at least a portion of the first member opposes at least a portion of the second member, where the first member is magnetically held to the second member by a first magnet disposed in the first member engaging a second magnet disposed in the second member; detecting, by a sensor disposed in the second member adjacent to the second magnet, a first magnetic field produced by the first magnet in the first member; and in response to the detecting the first magnetic field produced by the first magnet, sending a signal to a processor to indicate that the first member is in the first position.

In Example M2, the subject matter of Example M1 can optionally include where the second magnet is oriented relative to the sensor to produce a second magnetic field that is undetectable by the sensor.

In Example M3, the subject matter of any one of Examples M1-M2 can optionally include where the first magnet is oriented such that the first magnetic field runs perpendicular to a first surface of the first member, and where the second magnet is oriented such that a second magnetic field produced by the second magnet runs parallel to a second surface of the second member.

In Example M4, the subject matter of any one of Examples M1-M3 can optionally include where the first magnet and the second magnet are selected from a group of magnets, the group of magnets including a bar magnet, a cylindrical magnet, and a disk magnet.

In Example M5, the subject matter of any one of Examples M1-M4 can optionally include where the first member comprises a first display screen with an edge spaced from an end of the first member; and a first bezel area between the edge of the first display screen and the end of the first member, where the first magnet is contained in the first bezel area.

In Example M6, the subject matter of any one of Examples M1-M5 can optionally include where the second member comprises: a second display screen with an edge spaced from an end of the second member; and a second bezel area between the edge of the second display screen and the end of the second member, where the sensor and the second magnet are contained in the second bezel area.

In Example M7, the subject matter of any one of Examples M1-M6 can optionally include changing a state of the computing device to a sleep state based on the processor receiving the signal indicating that the first member is in the first position; and changing the state of the computing device to a working state based on the processor not receiving the signal indicating that the first member is in the first position.

In Example M8, the subject matter of any one of Examples M1-M7 can optionally include a mechanical attachment component connecting a first end of the first member and a second end of the second member and defining a fixed axis of rotation about which at least the first member is rotatable.

In Example M9, the subject matter of any one of Examples M1-M8 can optionally include where in a second position, the first surface of the first member and the second surface of the second member define an angle sufficient to prevent attraction between the first magnet and the second magnet, and where the method further comprises stopping the detecting of the first magnetic field produced by the first magnet and stopping the sending of the signal to the processor.

In Example M10, the subject matter of any one of Examples M1-M4, or M6 can optionally include where the first member is slidably movable in a longitudinal direction relative to the second member to at least one other position.

In Example M11, the subject matter of any one of Examples M1-M4, M6, or M10 can optionally include where the second member further comprises: a second display screen, where in the first position, the first member covers a lower section of the second display screen, and where the method further comprises: in response to receiving the signal from the sensor, preventing data from being displayed in the lower section of the second display screen and providing data for display in an upper exposed section of the second display screen.

In Example M12, the subject matter of any one of Examples M1-M4, M6, M10, or M11, can optionally include where in response to the first member being moved longitudinally relative to the first member: magnetically holding the first member of the computing device to the second member of the computing device in a second position such that the first surface of the first member opposes at a second portion of the second member, where the first member is magnetically held to the second member by the first magnet in the first member engaging a third magnet disposed in the second member; detecting, by a second sensor disposed in the second member adjacent to the third magnet, the first magnetic field produced by the first magnet in the first member; and in response to the detecting the first magnetic field produced by the first magnet, sending a second signal to the processor to indicate that the first member is in the second position.

In Example M13, the subject matter of Example M12 can optionally include where the second member further comprises: a second display screen, where in a second position, the first member covers an upper section of the second display screen, and where the method further comprises, in response to receiving the second signal from the second sensor, preventing data from being displayed in the upper section of the second display screen and configuring a lower section of the second display screen for an alternative use.

An Example Y1 provides an apparatus, the apparatus comprising means for performing the method of any one of the Examples M1-M13.

In Example Y2, the subject matter of Example Y1 can optionally include that the means for performing the method comprises at least one processor and at least one memory element.

In Example Y3, the subject matter of Example Y2 can optionally where at least one memory element comprises machine readable instructions that when executed, cause the apparatus to perform the method of any one of Examples M1-M13.

In Example Y4, the subject matter of any one of Examples Y1-Y3 can optionally include that the apparatus is one of a computing system or a system-on-a-chip.

An Example X1 provides at least one machine readable storage medium comprising instructions, where the instructions when executed realize an apparatus, realize a system, or implement a method in any one of the preceding Examples A1-A13 or M1-M13.

What is claimed is:

1. An apparatus comprising:
    a first member with a first surface, the first member comprising a first magnet configured to produce a first magnetic field;
    a second member with a second surface, wherein the first member is movable relative to the second member, the second member comprising:
        a sensor operatively connected to a processor; and
        a second magnet adjacent to the sensor,
    wherein in a first position, the first magnet and the second magnet are engaged to magnetically hold the first member to the second member such that at least a portion of the first surface of the first member opposes at least a portion of the second surface of the second member, and wherein in the first position, the sensor is positioned intermediate the first magnet and the second magnet and is to detect the first magnetic field produced by the first magnet and send a signal to the processor in response to detecting the first magnetic field produced by the first magnet.

2. The apparatus of claim 1, wherein the second magnet is oriented relative to the sensor to produce a second magnetic field that is undetectable by the sensor.

3. The apparatus of claim 2, wherein the first magnet is oriented such that the first magnetic field runs perpendicular to the first surface of the first member, and wherein the second magnet is oriented such that the second magnetic field produced by the second magnet runs parallel to the second surface of the second member.

4. The apparatus of claim 1, wherein the first magnet and the second magnet are selected from a group of magnets, the group of magnets including a bar magnet, a cylindrical magnet, and a disk magnet.

5. The apparatus of claim 1, wherein the first member comprises:
    a first display screen with an edge spaced from an end of the first member; and
    a first bezel area between the edge of the first display screen and the end of the first member, wherein the first magnet is contained in the first bezel area.

6. The apparatus of claim 1, wherein the second member comprises:
    a second display screen with an edge spaced from an end of the second member; and
    a second bezel area between the edge of the second display screen and the end of the second member, wherein the sensor and the second magnet are contained in the second bezel area.

7. The apparatus of claim 1, wherein the processor is to:
    change from a working state to a sleep state when the first member is moved from a second position to the first position.

8. The apparatus of claim 1, the apparatus further comprising:
    a mechanical attachment component connecting a first end of the first member and a second end of the second member and defining a fixed axis of rotation about which at least the first member is rotatable.

9. The apparatus of claim 8, wherein in a second position, the first surface of the first member and the second surface of the second member define an angle sufficient to prevent attraction between the first magnet and the second magnet, and the sensor is to stop detecting the first magnetic field produced by the first magnet and is to stop sending the signal to the processor.

10. The apparatus of claim 1, wherein the first member is slidably movable in a longitudinal direction relative to the second member to at least one other position.

11. The apparatus of claim 10, wherein the second member further comprises:
    a second display screen, wherein in the first position, the first member covers a lower section of the second display screen, and wherein the processor is to:
        in response to receiving the signal from the sensor, prevent data from being displayed in the lower section of the second display screen; and
        provide data for display in an upper exposed section of the second display screen.

12. The apparatus of claim 1, and wherein the second member further comprises:
    a second sensor operatively connected to the processor; and
    a third magnet adjacent to the second sensor,
    wherein in a second position, the first magnet and the third magnet are engaged to magnetically hold the first member to the second member such that the first surface of the first member opposes a second portion of the second surface of the second member, and the second sensor is to detect the first magnetic field produced by the first magnet and is to send a second signal to the processor in response to detecting the first magnetic field produced by the first magnet.

13. The apparatus of claim 12, wherein the second member further comprises:
a second display screen, wherein in the second position, the first member covers an upper section of the second display screen, and wherein the processor is to:
in response to receiving the second signal from the second sensor, prevent data from being displayed in the upper section of the second display screen; and
configure a lower section of the second display screen for an alternative use.

14. A system comprising:
a processor;
a first magnet disposed in a first member;
a sensor operatively connected to the processor and disposed in a second member connected to the first member, wherein the first member is movable relative to the second member, the sensor to:
detect, when the first member is in a first position, a first magnetic field produced by the first magnet; and
send a signal to the processor in response to detecting the first magnetic field produced by the first magnet; and
a second magnet disposed in the second member and adjacent to the sensor, wherein when the first member is in the first position, the sensor is positioned between the first magnet and the second magnet and the second magnet is to engage the first magnet to magnetically hold the first member to the second member.

15. The system of claim 14, wherein the second magnet oriented relative to the sensor to produce a second magnetic field that is not detectable by the sensor.

16. The system of claim 15, wherein the first magnet is oriented such that the first magnetic field runs perpendicular to a first surface of the first member, and wherein the second magnet is oriented such that the second magnetic field runs parallel to a second surface of the second member.

17. The system of claim 14, the system further comprising:
a display screen contained in the first member, the display screen having an edge spaced from an end of the first member; and
a bezel area between the edge of the display screen and the end of the first member, wherein the first magnet is contained in the bezel area.

18. The system of claim 14, wherein the processor is to:
change from a working state to a sleep state when the first member is moved from a second position to the first position.

19. The system of claim 14, wherein the first member is longitudinally movable relative to the second member to at least one other position.

20. A method comprising:
magnetically holding a first member of a computing device to a second member of the computing device in a first position such that at least a portion of the first member opposes at least a portion of the second member, wherein the first member is magnetically held to the second member by a first magnet disposed in the first member engaging a second magnet disposed in the second member;
detecting, by a sensor disposed in the second member adjacent to the second magnet and positioned intermediate the first magnet and the second magnet when the first member and the second member are magnetically held in the first position, a first magnetic field produced by the first magnet in the first member; and
in response to the detecting the first magnetic field produced by the first magnet, sending a signal to a processor to indicate that the first member is in the first position.

21. The method of claim 20, wherein the second magnet is oriented relative to the sensor to produce a second magnetic field that is undetectable by the sensor.

22. The method of claim 20, wherein the first magnet is oriented such that the first magnetic field runs perpendicular to a first surface of the first member, and wherein the second magnet is oriented such that a second magnetic field produced by the second magnet runs parallel to a second surface of the second member.

23. The method of claim 20, further comprising:
changing a state of the computing device to a sleep state based on the processor receiving the signal indicating that the first member is in the first position; and
changing the state of the computing device to a working state based on the processor not receiving the signal indicating that the first member is in the first position.

* * * * *